United States Patent [19]

Horlacher et al.

[11] Patent Number: 5,112,925
[45] Date of Patent: May 12, 1992

[54] SPECIAL DIORGANOSILOXANE BLOCK COPOLYCARBONATES

[75] Inventors: Peter Horlacher, Senden; Heinrich Hähnsen, Duisberg; Ulrich Grigo, Kempen; William C. Bushong, Krefeld; Ottfried Schlak, Cologne, all of Fed. Rep. of Germany

[73] Assignee: Bayer Aktiengesellschaft, Leverkusen, Fed. Rep. of Germany

[21] Appl. No.: 678,468

[22] Filed: Apr. 1, 1991

Related U.S. Application Data

[63] Continuation of Ser. No. 557,429, Jul. 23, 1990, abandoned.

[30] Foreign Application Priority Data

Jul. 28, 1989 [DE] Fed. Rep. of Germany ....... 3924992

[51] Int. Cl.⁵ .................. C08F 283/00; C08G 77/04
[52] U.S. Cl. ...................... 525/474; 528/26; 528/29; 528/31
[58] Field of Search ............... 528/26, 29, 33; 525/474

[56] References Cited

U.S. PATENT DOCUMENTS

| 3,189,662 | 6/1965 | Vaughn | 260/824 |
|---|---|---|---|
| 3,419,634 | 12/1968 | Vaughn | 260/824 |
| 3,821,325 | 6/1974 | Merritt, Jr. et al. | 260/824 |
| 3,832,419 | 8/1974 | Merritt, Jr. | 260/824 |
| 4,177,201 | 12/1979 | de Montigny et al. | 260/448.2 |
| 4,260,715 | 4/1981 | de Montigny et al. | 556/453 |
| 4,570,024 | 2/1986 | Mizui et al. | 585/24 |
| 4,584,360 | 4/1986 | Paul et al. | 528/14 |
| 4,612,403 | 9/1986 | Virnig | 568/454 |
| 4,681,922 | 7/1987 | Schmidt | 525/474 |
| 5,011,899 | 4/1991 | Sybert | 528/26 |

FOREIGN PATENT DOCUMENTS

| 374635 | 6/1990 | European Pat. Off. |
| 3832396 | 2/1990 | Fed. Rep. of Germany |
| 62-00050 | 1/1987 | Japan |

*Primary Examiner*—John C. Bleutge
*Assistant Examiner*—M. W. Glass
*Attorney, Agent, or Firm*—Joseph C. Gil; Aron Preis

[57] ABSTRACT

The present invention relates to a process for the preparation of polydiorganosiloxane block copolycarbonates having special bridging members between the siloxane blocks and the carbonate blocks, and the polydiorganosiloxane block copolycarbonates which are obtainable by the process according to the invention and with which optionally further customary additives can be mixed.

4 Claims, No Drawings

SPECIAL DIORGANOSILOXANE BLOCK COPOLYCARBONATES

This application is a continuation of application Ser. No. 07/557,429 filed Jul. 23, 1990, now abandoned.

Polydiorganosiloxane block copolycarbonates and their preparation from polydiorganosiloxanes having terminal hydroxyaryloxy groups are known (see for example German Offenlegungsschrift 3,506,572, U.S. Pat. No. 3,189,662, German Offenlegungsschrift 3,334,782, U.S. Pat. No. 3,419,634, U.S. Pat. No. 3,821,325 and U.S. Pat. No. 3,832,419).

Polysiloxane block copolycarbonates can be used in a known manner for coating, for insulation for parts and laminates and in adhesives. They can be used wherever the known aromatic polycarbonates have been used to date and where in addition improved mechanical properties at lower temperatures and/or improved fire behaviour are desired, for example in the motor vehicle sector and electrical sector. However, by incorporating polydiorganosiloxanes into polycarbonates, the surface tension is reduced. This proves to be a disadvantage or problem particularly in applications where the moulding of polydiorganosiloxane/polycarbonate is coated.

Surprisingly, it has been found that polydiorganosiloxane block copolycarbonates based on diphenols of the formula (I)

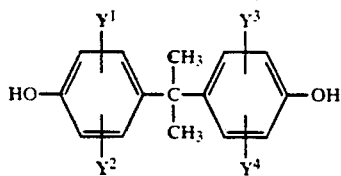

wherein $Y^1$ to $Y^4$ are identical or different and denote hydrogen, halogen or $C_1$-$C_4$-alkyl, preferably methyl, hydrogen, chlorine or bromine, lead to an improved surface tension when α,ω-bishydroxyaryloxypolydiorganosiloxanes having the following structure are used. The increased surface tension also improves the wetting, so that, for example, substantially improved coatability results.

The α,ω-bishydroxyaryloxypolydiorganosiloxanes to be used according to the invention correspond to the formula (II)

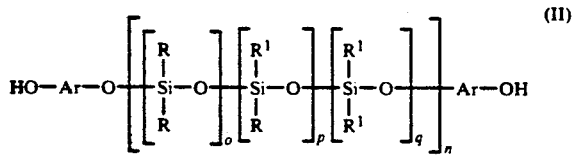

wherein
R and $R^1$ are identical or different and are linear $C_1$-$C_{20}$-alkyl, branched $C_3$-$C_{30}$-alkyl, $C_2$-$C_6$-alkenyl or $C_6$-$C_{14}$-aryl, and the alkyl radicals and the aryl radicals may be halogenated, and R and $R^1$ are each preferably $CH_3$, wherein the number of diorganosiloxy units is $n = o+p+q = 5$ to 200, preferably 20 to 80, where o, p and q as such may be zero or integers from 1 to 200, and wherein —Ar— is either a divalent radical of the formula (III)

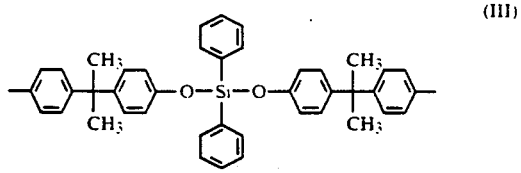

or a divalent radical of the general formula (IV)

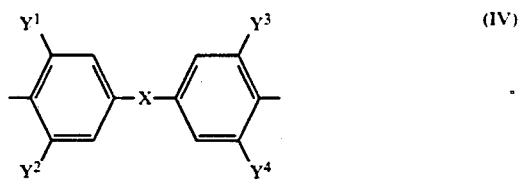

wherein $Y^1$ to $Y^4$ have the meaning stated for formula (I) and may furthermore be phenyl, and wherein —X— is a divalent radical selected from

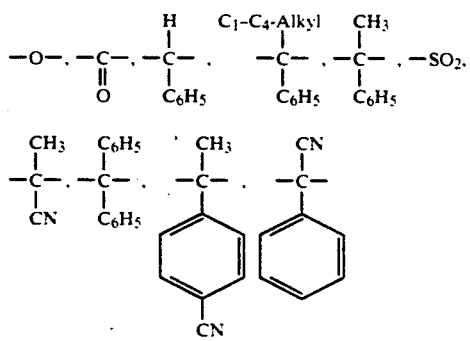

and (IVa)

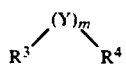  (IVa)

where, in (IVa) "m" denotes an integer from 4 to 7, preferably 4 or 5, $R^3$ and $R^4$ can be individually selected for each Y and independently of one another denote hydrogen or $C_1$-$C_6$-alkyl, and Y denotes carbon, with the proviso that $R^3$ and $R^4$ are identical or different.

For the radicals R and $R^1$ in formula (II), halogenated means partially or completely chlorinated, brominated or fluorinated.

Examples of the radicals R and $R^1$ in formula (II) are methyl, ethyl, propyl, n-butyl, tert-butyl, vinyl, phenyl, naphthyl, chloromethyl, trifluoropropyl, perfluorobutyl and perfluorooctyl.

The present invention thus relates to a process for the preparation of polydiorganosiloxane block copolycarbonates from diphenols and α,ω-bishydroxyaryloxypolydiorganosiloxanes, chain terminators, carbonate donors and optionally branching agents under the known reaction conditions of phase boundary polycondensation, which is characterised in that diphenyls of the formula (I) are used in amounts of 99.95 mol % to 80 mol %, preferably 99.94 mol % to 90 mol %, and α,ω-bishydroxyaryloxypolydiorganosiloxanes of the formula (II) are used in amounts of 0.05 mol % to 20 mol %, preferably 0.06 mol % to 10 mol %, the molar sum of (I)+(II) being 100 mol % in each case.

The present invention furthermore relates to the polydiorganosiloxane block copolycarbonates obtainable by the process according to the invention.

The polydiorganosiloxane block copolycarbonates obtainable according to the invention have mean molecular weights $M_w$ (weight average, measured in a known manner by ultracentrifuging or measurement of light scattering) of between 10000 and 300000, preferably between 15000 and 80000.

The diphenols of the formula (I) are known as such or can be prepared by known processes (see for example H. Schnell, Chemistry and Physics of Polycarbonates, Polymer Reviews, Vol. 9, 1964, Interscience Publishers New York, London, Sydney).

Examples of suitable diphenols of the formula (I) are
2,2-bis-(4-hydroxyphenyl)-propane
2,2-bis-(3,5-dimethyl-4-hydroxyphenyl)-propane
2,2-bis-(3,5-diphenyl-4-hydroxyphenyl)-propane
2,2-bis-(3-methyl-4-hydroxyphenyl)-propane
2,2-bis-(3,5-dichloro-4-hydroxyphenyl)-propane and
2,2-bis-(3,5-dibromo-4-hydroxyphenyl)-propane.

Preferred diphenols of the formula (I) are
2,2-bis-(4-hydroxyphenyl)-propane
2,2-bis-(3,5-dimethyl-4-hydroxyphenyl)-propane
2,2-bis-(3,5-dichloro-4-hydroxyphenyl)-propane and
2,2-bis-(3,5-dibromo-4-hydroxyphenyl)-propane.

The α,ω-bishydroxyaryloxypolydiorganosiloxanes of the formula (II) are in principle known or can be prepared by known processes, for example according to German Offenlegungsschrift 3,334,782 (Le A 22 594).

Polydiorganosiloxanes containing terminal α,ω-bisacyloxy groups and of the formula (V)

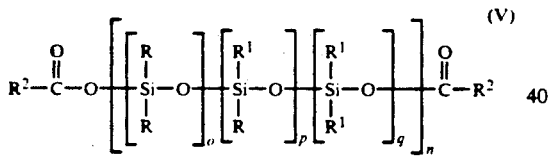

wherein R, $R^1$, o, p, q and n have the meanings stated for formula (II) and wherein $R^2$ is $C_1$-$C_{10}$-alkyl, are reacted with diphenols of the formula (IV).

wherein —Ar— likewise has the meanings stated for formula (II), in a molar ratio (V):(VI) of 1:2 to 1:20, optionally with the use of inorganic bases, for example alkali metal carbonates or alkaline earth metal carbonates, such as $Na_2CO_3$ or $K_2CO_3$, in at least stoichiometric amounts, relative to the number of moles of (V). Both pure compounds of the formulae (V) and/or (VI) and mixtures of the compounds of formulae (V) and/or (VI) can be used.

It has proved to be advantageous to add the bisacyloxypolydiorganosiloxane, dissolved in an inert organic solvent, to a solution of the diphenol in an inert organic solvent, which optionally also contains an inorganic base, although any other sequence of addition can also be effected without complications.

If a base is dispensed with in the reaction of the reactants, the liberated acid, for example acetic acid, can also be removed by distillation, optionally under reduced pressure.

The reaction temperatures are between 0° C. and 150° C., preferably between 70° C. and 130° C.

The polydiorganosiloxanes containing terminal α,ω-bisacyloxy groups and to be used as starting compounds are either known (see European Patent Specifications No. 0,003,285 or 0,012,892) or can be prepared by processes known from the literature.

With regard to (VIa)

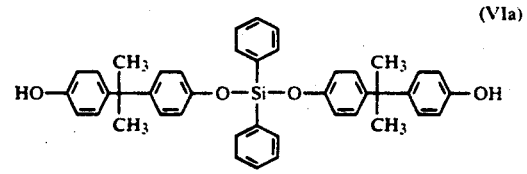

and with regard to (VIb)

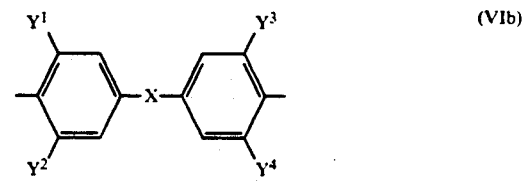

$Y^1$ to $Y^4$ have the meaning stated for formula (IV) and wherein —X— is

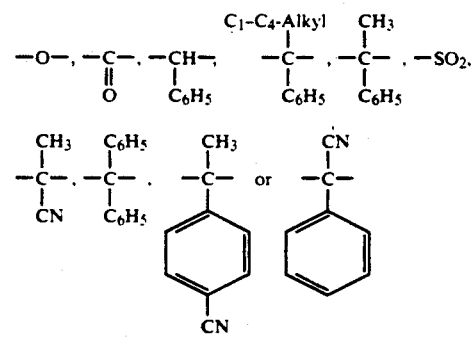

the compounds to be used as diphenols of the formula (VI) are either known from Encyclopedia of polymer science and engineering, Volume 11, second edition, John Wiley and Sons, Inc. 1988, page 648, or can be prepared by known processes, and, with regard to (VIc)

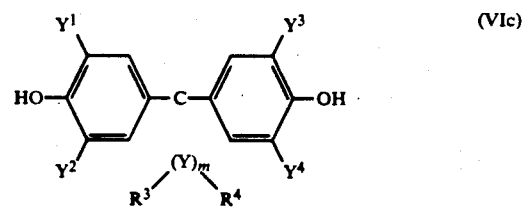

wherein $Y^1$ to $Y^4$ have the meaning stated for formula (IV) and Y, $R^3$ and $R^4$ have the meaning stated for formula (IVa), form the subject of German Patent Application P 3 832 396.6 (Le A 26 344) and are described in Japanese Preliminary Published Applications 62 039/1986, 62040/1986 and 105 550/1986, or can be prepared according to the teaching of these publications.

Examples of suitable diphenols of the formula (VI) are bis-(4-hydroxyphenyl) ether,
4,4'-dihydroxybenzophenone,
bis-(4-hydroxyphenyl)-phenylmethane,
bis-(4-hydroxyphenyl)-diphenylmethane,
bis-(4-hydroxyphenyl)-cyano-phenyl-methane,
di-(4-(p-hydroxyphenylisopropyl)-phenoxy)-diphenyl-silane,
bis-(4-hydroxy-3,5-dimethylphenyl) ether,
bis-(4-hydroxy-3,5-dimethylphenyl)-phenylmethane,
1,1-bis-(4-hydroxyphenyl)-3,3,5-trimethylcyclohexane,
1,1-bis-(4-hydroxyphenyl)-3,3-dimethylcyclohexane,
1,1-bis-(4-hydroxyphenyl)-3,3-dimethylcyclopentane and
1,1-bis-(4-hydroxyphenyl)-cyclohexane.

Preferred diphenols of the formula (VI) are
di-(4-(p-hydroxy-phenyl-isopropyl)-phenoxy)-diphenyl-silane,
4,4'-dihydroxybenzophenone,
1,1-bis-(4-hydroxyphenyl)-1-(p-cyanophenyl)-ethane and
bis-(4-hydroxyphenyl)-cyano-phenylmethane.

Examples of suitable polydiorganosiloxanes (V) containing terminal α,ω-bisacyloxy groups are

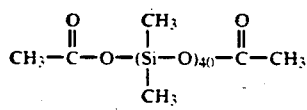
(Va)

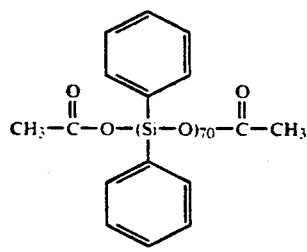
(Vb)

and

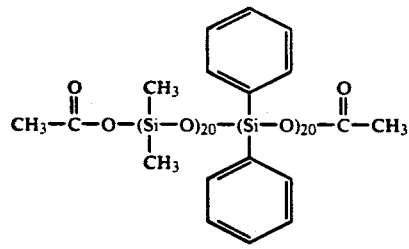
(Vc)

An example of preferred compounds (V) is (Vd)

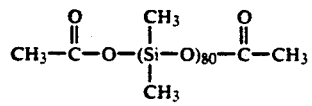
(Vd)

Examples of the α,ω-bishydroxyaryloxydiorganosiloxanes of the formula (II) to be used according to the invention are

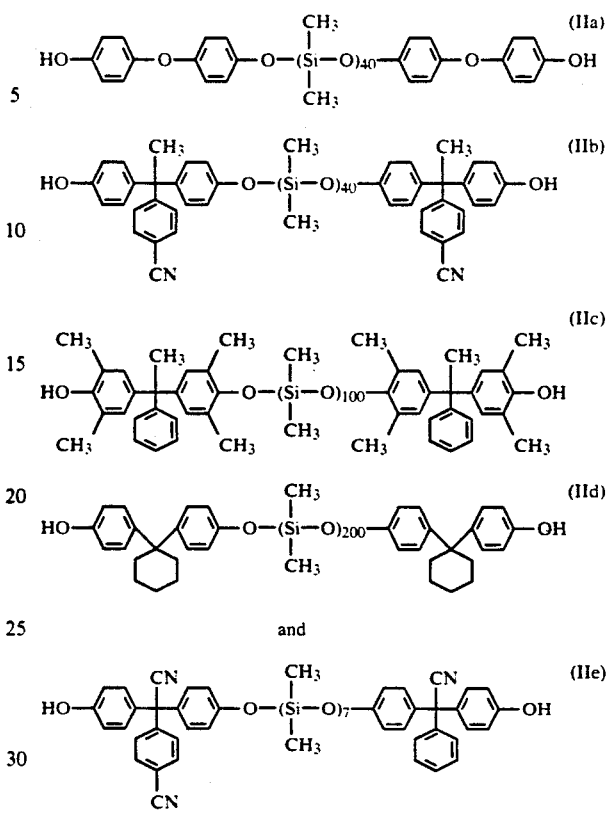

and

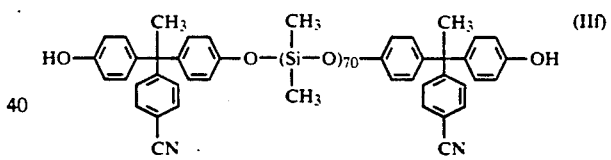

An example of preferred compounds of the formula (II) is (IIf)

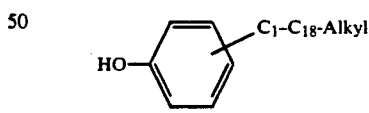
(IIf)

Examples of suitable chain terminators are the phenols usually used in polycarbonate synthesis, in addition to phenols itself in particular halogenated phenols, such as 2,4,6-tribromophenol, and alkylated phenols, such as HO—⟨ ⟩—$C_1$-$C_{18}$-Alkyl Instead of the phenols, it is also possible to use their halocarbonic esters. The amount of chain terminator depends on the molecular weight of the block copolycarbonates to be prepared. In general, 0.5 mol % to 10.0 mol %, relative to diphenols used, are employed.

Carbonate donors used in the known manner for the preparation by the two-phase boundary process are carbonic acid halides, in particular carbonic acid chlorides, such as, for example, phosgene or $COBr_2$, or the bischlorocarbonic esters of the diphenols (I) or of the α,ω-bishydroxyaryloxypolydiorganosiloxanes (II), which can be prepared in a known manner from the compounds (I) and (II), less than ½ mole of diphenol being used in each case per halocarbonic acid group.

Phosgene is a preferred carbonate donor.

Branching agents which can be used are those having three or more than three functional groups, in particular those having three or more than three phenolic hydroxyl groups, and the usual known amounts of branching agents of between 0.05 and 2 mol %, relative to diphenols (I)+(II), must be adhered to. The preparation of branched polycarbonates is described, for example, in German Offenlegungsschrift 1,570,533 and German Offenlegungsschrift 1,595,762 and in U.S. Pat. No. 3,544,514.

Some of the usable compounds having three or more than three phenolic hydroxyl groups are, for example, 2,4-bis-(4-hydroxyphenyl-isopropyl)-phenol, 2,6-bis-(2'-hydroxy-5'-methyl-benzyl)-4-methylphenol, 2-(4-hydroxyphenyl)-2-(2,4-dihydroxyphenyl)-propane and 1,4-bis-(4,4'-dihydroxytriphenyl-methyl)-benzene.
Some of the other trifunctional compounds are 2,4-dihydroxybenzoic acid, trimesic acid, cyanuric chloride and 3,3-bis-(4-hydroxyphenyl)-2-oxo-2,3-dihydroindole and 3,3-bis-(4-hydroxy-3-methyl-phenyl)-2-oxo-2,3-dihydroindole.

The preparation, according to the invention, of the polydiorganosiloxane block copolycarbonates by the phase boundary process can be carried out, for example, according to German Offenlegungsschrift 3,506,472 (Le A 23 654) by adding the α,ω-bishydroxyaryloxypolydiorganosiloxanes (II) and the chain terminators together with the diphenols (I) before the addition of the carbonate donor, that is to say, for example, before the introduction of phosgenes, or by metering in the compounds (I) and (II) separately during or after the introduction of phosgene, but in each case before the addition of the polycondensation catalyst.

Suitable catalysts for the polycondensation by the two-phase boundary process are the tertiary aliphatic amine catalysts known for polycarbonate synthesis, such as trimethylamine, triethylamine, n-tripropylamine, n-tributylamine or N-ethylpiperidine; the known quaternary ammonium salts, such as, for example, tetrabutylammonium bromide, may also be used (see German Offenlegungsschrift 3,506,472).

Suitable organic solvents for the two-phase boundary process are those known for the thermoplastic polycarbonates, such as, for example, methylene chloride or chlorobenzene.

The amounts of organic phase are preferably chosen so that the two-phase boundary polycondensation is carried out with 5 to 20% strength organic solution, preferably with 10 to 15% organic solution.

Suitable basic compounds for the formation of the aqueous alkaline phase are solutions LiOH, NaOH, KOH, Ca(OH)$_2$ and/or Ba(OH)$_2$ in water.

In the preparation by the two-phase boundary process, the amounts by volume of aqueous alkaline phase are preferably equal to the amount of the total organic phase. They may also be larger or smaller than the total amounts of the organic phase in terms of volume.

The pH of the aqueous phase during the reaction is between pH 9 and 14, preferably pH 12 and 13.

The particular reactant ratios of diphenyl (I) to α,ω-bishydroxyaryloxypolydiorganosiloxane (II) to be used depend on the content of poly(diorganosiloxane) units to be achieved in the block copolymer to be prepared, the reactants normally undergoing quantitative conversion.

Isolation of the block copolycarbonates according to the invention can be carried out by the method known from polycarbonate synthesis. In this method, the organic phase containing the copolycarbonate in solution is separated off and washed and the copolycarbonate is then isolated by evaporating the solution, a devolatilisation extruder preferably being used as the final stage of the working up process.

The block copolycarbonates according to the invention can be processed in a known manner to various mouldings. semifinished products, films, solid panels, double ribbed plates, blown articles, bottles, etc., for example by extrusion or injection moulding methods or by the blow moulding method.

The additives usually used for polycarbonates, that is to say H$_2$O, heat or UV stabilisers, flameproofing agents, pigments, flow improvers, mould release agents, antistatic agents, fillers, such as glass powder, graphite, molybdenum sulphide or quartz products, and reinforcing substances, such as glass fibres or perfluorinated polyolefins, can be added, in the amounts usually used for thermoplastic polycarbonates, to the block copolycarbonates according to the invention, before or during or after their preparation or during their processing to mouldings.

The present invention thus also relates to a process for incorporating additives into the polydiorganosiloxane block copolycarbonates according to the invention, which is characterised in that at least one additive selected from stabilisers, flameproofing agents, pigments, flow improvers, mould release agents, antistatic agents, fillers and reinforcing agents is mixed in a known manner with the polydiorganosiloxane block copolycarbonates before or during or after preparation or during their processing to mouldings.

The present invention furthermore relates to the polydiorganosiloxane block copolycarbonates obtainable by the process according to the invention, which are characterised in that they contain at least one additive selected from stabilisers, flameproofing agents, pigments, flow improvers, mould release agents, antistatic agents, fillers and reinforcing agents.

The polydiorganosiloxane block copolycarbonates according to the invention can be used, for example, wherever mouldings having great toughness have to be coated, which is impossible or very difficult with the polysiloxane block copolycarbonates used to date.

METHOD OF MEASUREMENT

The surface tension of a solid is determined according to the prior art by measuring the contact angle of test liquids (water, glycerol, formamide, dimethyl phthalate, methylene iodide and hexadecane). With the aid of the measured contact angle and the values of the surface tensions of the test liquids having known polar/nonpolar components, the surface tension of the solid is then obtained, likewise divided into a polar component and a nonpolar component. The measurement was carried out as follows:

First, a video image of the drop is produced, after which the brightness values of the associated image pixels are digitalised and stored in a computer. The computer determines and analytically approximates by means of a polynomial the contour of the drop and in the environment of the three-phase point where liquid, solid surface and atmosphere come into contact with one another, in an X—Y coordinate system. The contact angle is determined by forming the first derivative of the polynomial at the three-phase point.

One of the advantages of this method is its high accuracy.

EXAMPLE 1 (COMPARATIVE EXAMPLE)

19.2 parts by weight of bisphenol A and 1800 parts by weight of chlorobenzene are introduced into a vessel provided with a condenser, a thermometer, a drop funnel and a stirrer. The mixture is heated to 100° C. and 11.6 parts by weight of potassium carbonate are added. Thereafter, a solution of 178 parts by weight of $\alpha,\omega$-bisacetoxypolydimethylsiloxane, $P_n=80$, in 178 parts by weight of chlorobenzene are added to the refluxing mixture over a period of 15 minutes, stirring being continued for a further two hours. The mixture is cooled to about 80° C. and filtered while still hot.

3035 parts by weight of bisphenol A, 3034 parts by weight of sodium hydroxide, 34700 parts by weight of water, 17800 parts by weight of dichloromethane and 13100 parts by weight of chlorobenzene and 74.2 parts by weight of phenol are added to the solution of polydimethylsiloxane having terminal bisphenol A groups (=5% by weight of $SiMe_2O$) in a reaction flask equipped with a stirrer, a phosgene inlet tube, a reflux condenser, an internal thermometer and a dropping funnel. At room temperature, 2216 parts by weight of phosgene are passed in, the pH being kept at between 12 and 13 by adding 45% strength sodium hydroxide solution. The introduction takes about one hour. Thereafter, 11 parts by weight of triethylamine are added and stirring is continued for a further 45 minutes at pH 12 to 13. The cocondensate is worked up by methods customarily used for polycarbonate.

| Surface tension mN/m | Nonpolar component mN/m | Polar component mN/m | Polar component % |
|---|---|---|---|
| 32.5 | 30.3 | 2.2 | 6.8 |

EXAMPLE 2

The above process was repeated, except that, instead of the polydimethylsiloxane having terminal bisphenol A groups, a polydimethylsiloxane having terminal 4,4'-dihydroxybenzophenone groups and prepared according to the above method was used.

| Surface tension mN/m | Nonpolar component mN/m | Polar component mN/m | Polar component % |
|---|---|---|---|
| 42.9 | 42.5 | 0.4 | 0.9 |

EXAMPLE 3

The above process was repeated, except that, instead of the polydimethylsiloxane having terminal bisphenol A groups, a polydimethylsiloxane having terminal 1,1-bis-(4-hydroxyphenyl)-cyclohexane groups and prepared according to the above method was used.

| Surface tension mN/m | Nonpolar component mN/m | Polar component mN/m | Polar component % |
|---|---|---|---|
| 34.3 | 32.0 | 2.3 | 6.7 |

EXAMPLE 4

The above process was repeated, except that, instead of the polydimethylsiloxane having terminal bisphenol A groups, a polydimethylsiloxane having terminal bis-(4-hydroxyphenyl)-cyano-phenyl-methane groups prepared according to the above method was used.

| Surface tension mN/m | Nonpolar component mN/m | Polar component mN/m | Polar component % |
|---|---|---|---|
| 37.3 | 34.6 | 2.7 | 7.2 |

EXAMPLE 5 (COMPARISON)

Instead of a polydimethylsiloxane (Pn=80), a polydimethylsiloxane (Pn=40) having terminal bisphenol A groups was used.

| Surface tension mN/m | Nonpolar component mN/m | Polar component mN/m | Polar component % |
|---|---|---|---|
| 32.7 | 30.8 | 1.9 | 5.8 |

EXAMPLE 6

Instead of a polydimethylsiloxane (Pn=40) having terminal bisphenol A groups, the following polydimethylsiloxane containing terminal $\alpha,\omega$-bishydroxyaryl groups was used.

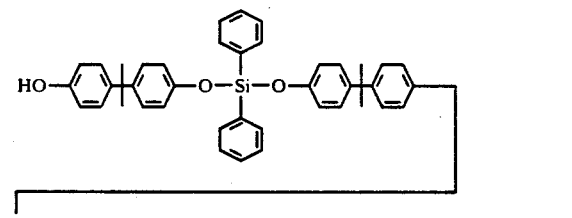

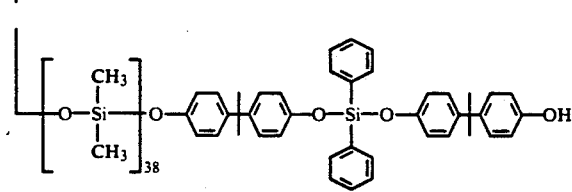

| Surface tension mN/m | Nonpolar component mN/m | Polar component mN/m | Polar component % |
|---|---|---|---|
| 38.6 | 35.4 | 3.2 | 8.3 |

What is claimed is:

1. A polydiorganosiloxane block copolycarbonate resin prepared under the reaction conditions of the phase boundary polycondensation process from reactants comprising (i) diphenols of formula (I)

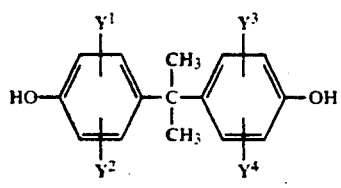 (I)

where $Y^1$ to $Y^4$ denote hydrogen, and (ii) α,ω-bishydroxyaryloxypoly-diorganosiloxane of formula (II)

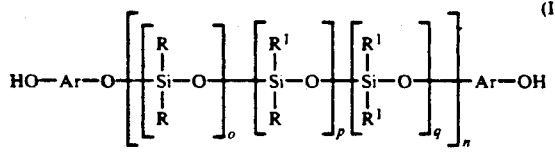 (II)

wherein R and $R^1$ independently are selected from the group consisting of methyl, ethyl, propyl, n-butyl, tert-butyl, vinyl, phenyl, naphthyl, chloromethyl, triflurorpropyl, perflurorobutyl and perflurorooctyl, and wherein n is the number of diorganosiloxy units such that $n=o+p+q=5$ to 200, and wherein o, p and q are integers of 0 to 200 and —Ar— is either a divalent radical conforming to

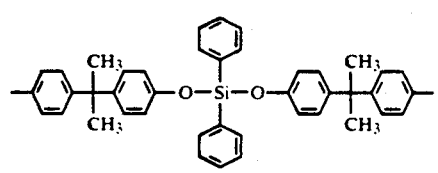 (III)

or a divalent radical conforming to (IV)

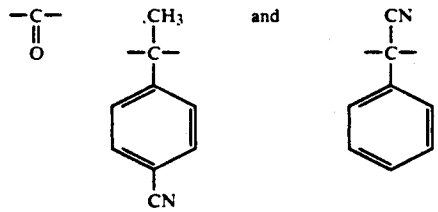 (IV)

wherein $Y^1$ to $Y^4$ denote hydrogen, and wherein —X— is a divalent radical selected from the group consisting of

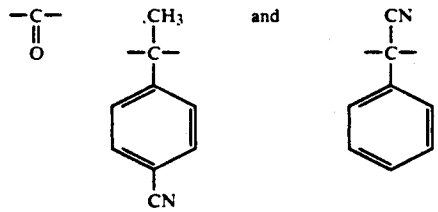

and at least one carbonate donor wherein said (i) is present in an amount of 80 to 99.95 mol % and said (ii) is present in an amount of 0.05 to 20 mole %, the molar sum of said (i)+said (ii) being 100 mol %.

2. The resin of claim 1 further comprising at least one additive selected from the group consisting of stabilizers, flameproofing agents, pigments, flow improvers, mold release agents, antistatic agents, fillers and reinforcing agents.

3. The resin of claim 1 wherein n is 20 to 80.

4. The resin of claim 1 wherein said —Ar— is

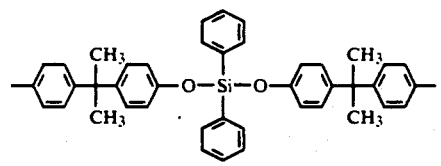 (III)

* * * * *